United States Patent
Kerr et al.

(10) Patent No.: US 7,172,181 B2
(45) Date of Patent: Feb. 6, 2007

(54) CURVED ELASTOMERIC SPRING

(75) Inventors: Ronald W. Kerr, Geneva, IL (US); Michael P. Molitor, North Aurora, IL (US)

(73) Assignee: Miner Elastomer Products Corp., Geneva, IL (US)

( * ) Notice: Subject to any disclaimer, the term of this patent is extended or adjusted under 35 U.S.C. 154(b) by 22 days.

(21) Appl. No.: 10/946,517

(22) Filed: Sep. 21, 2004

(65) Prior Publication Data

US 2006/0061026 A1    Mar. 23, 2006

(51) Int. Cl.
    *F16F 1/52*    (2006.01)
(52) U.S. Cl. ..................................... 267/153
(58) Field of Classification Search ............... 267/148, 267/149, 136, 153, 36.1, 47
    See application file for complete search history.

(56) References Cited

U.S. PATENT DOCUMENTS

| | | | |
|---|---|---|---|
| 2,980,158 A | 4/1961 | Meyer | |
| 3,456,939 A * | 7/1969 | Duchemin | 267/47 |
| 3,698,702 A * | 10/1972 | Beck | 267/47 |
| 4,489,922 A | 12/1984 | Fesko | |
| 4,557,500 A | 12/1985 | Collard et al. | |
| 4,611,793 A | 9/1986 | Nishiyama et al. | |
| 4,771,997 A | 9/1988 | Haldenwanger et al. | |
| 4,772,044 A | 9/1988 | Booher | |
| 4,886,266 A | 12/1989 | Trulaske | |
| 4,938,473 A | 7/1990 | Lee et al. | |
| 4,984,810 A | 1/1991 | Stearns et al. | |
| 4,988,080 A * | 1/1991 | Shah | 267/30 |
| 5,016,861 A | 5/1991 | Thompson et al. | |
| 5,029,801 A | 7/1991 | Dalebout et al. | |
| 5,251,930 A | 10/1993 | Kusaka et al. | |
| 5,280,890 A * | 1/1994 | Wydra | 267/220 |
| 5,425,829 A | 6/1995 | Chang | |
| 5,868,384 A * | 2/1999 | Anderson | 267/141.1 |
| 5,957,441 A * | 9/1999 | Tews | 267/153 |
| 6,012,709 A | 1/2000 | Meatto et al. | |
| 6,406,009 B1 | 6/2002 | Constantinescu et al. | |
| 6,457,729 B2 | 10/2002 | Stenvall | |
| 6,585,625 B1 | 7/2003 | Ferguson | |
| 6,719,671 B1 | 4/2004 | Bock | |
| 6,811,169 B2 | 11/2004 | Schroeder et al. | |
| 6,811,170 B2 | 11/2004 | Mosler | |

* cited by examiner

*Primary Examiner*—Christopher P. Schwartz
(74) *Attorney, Agent, or Firm*—John W. Harbst

(57) ABSTRACT

A compression spring created from a preform made from an elastomer which is free of spring-like characteristics and has a ratio of plastic strain to elastic strain greater than 1.5 to 1. The spring has elongate body with first and second longitudinally spaced free ends along with first and second generally planar arcuate surfaces extending between the ends. As a result of working the preform, portions of the elastomer from which the preform is created are oriented and the preform is transmuted into a curved elastomeric spring.

22 Claims, 10 Drawing Sheets

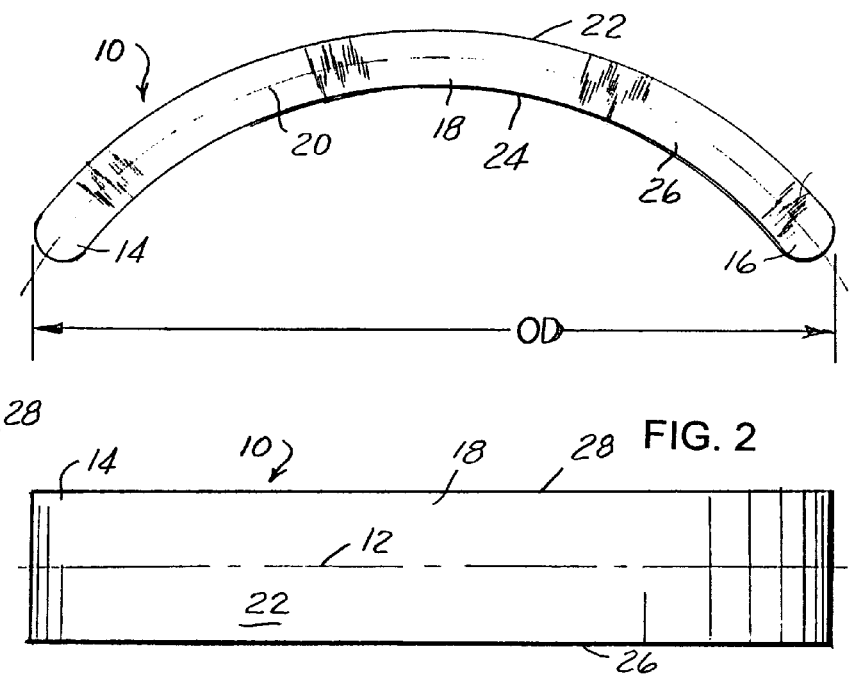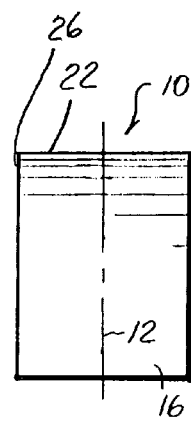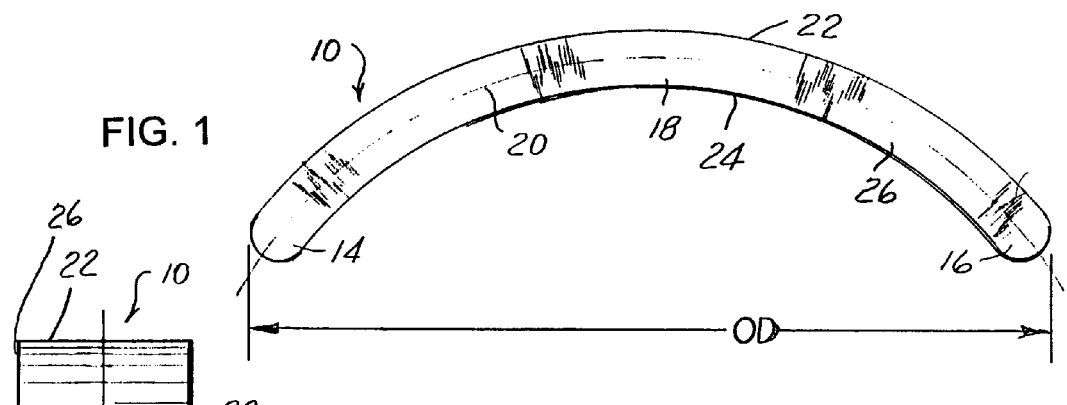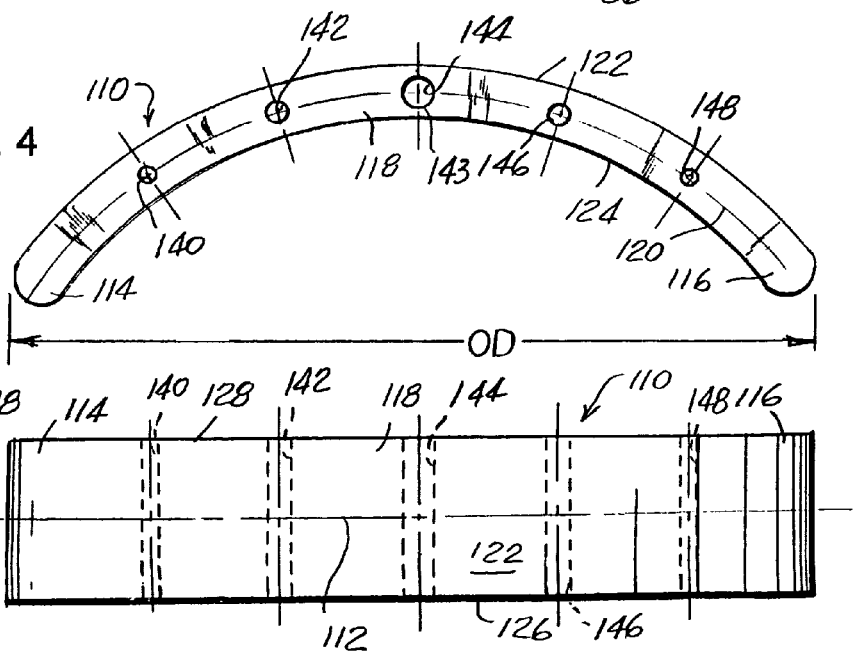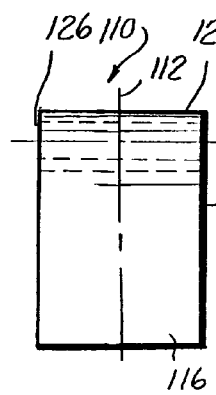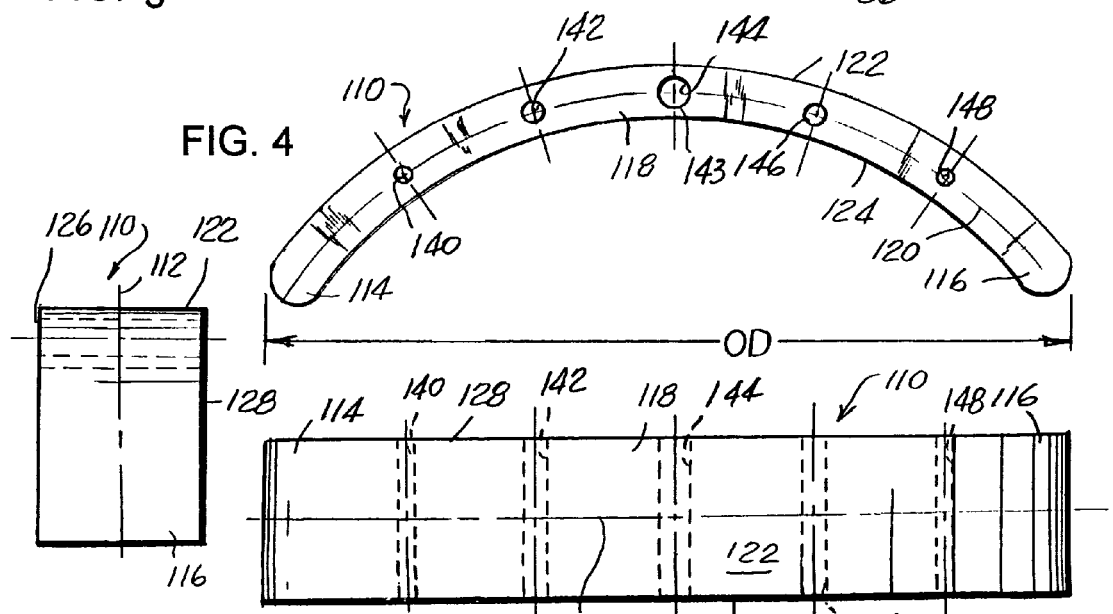

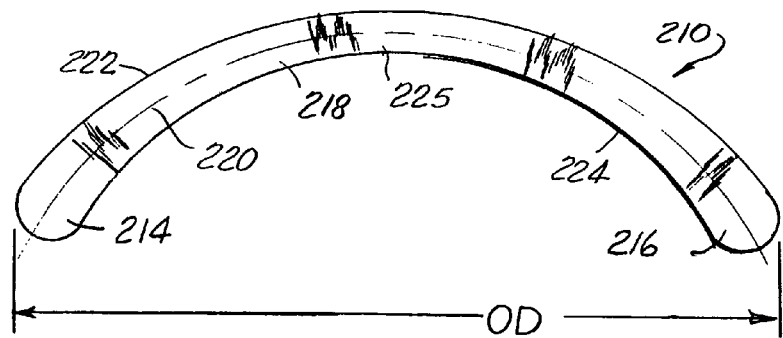
FIG. 7
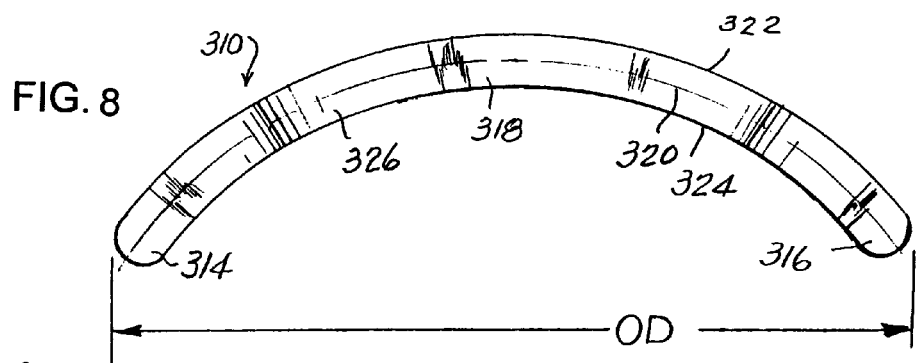
FIG. 8
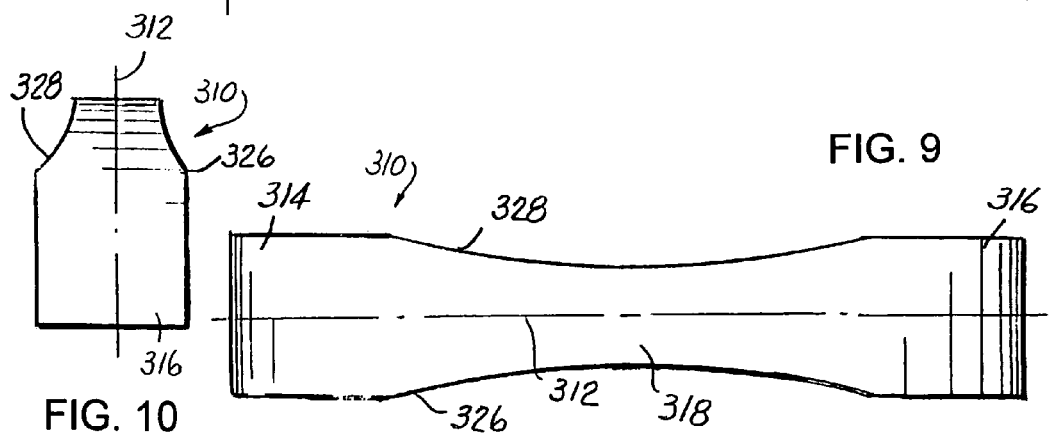
FIG. 9
FIG. 10

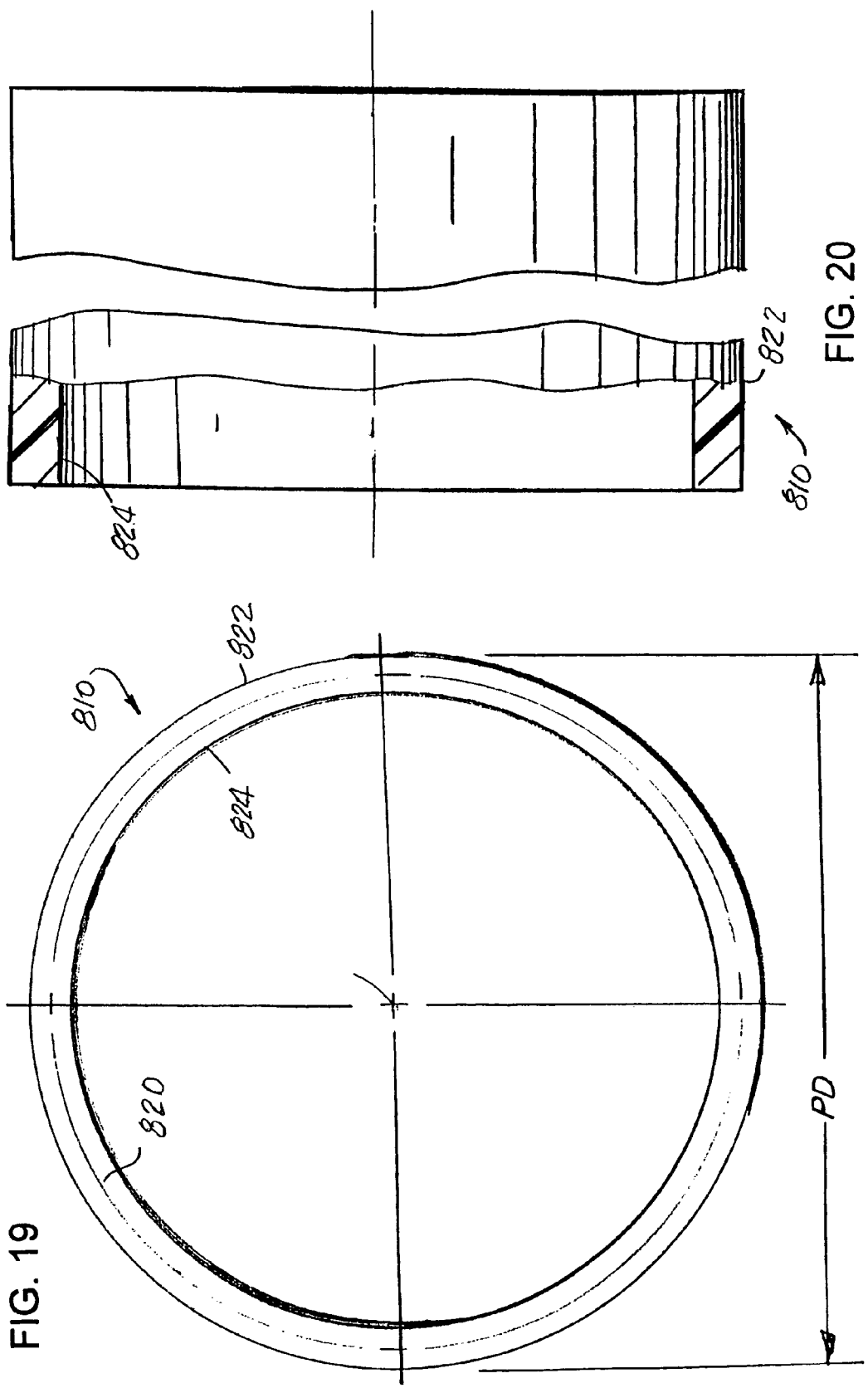

CURVED ELASTOMERIC SPRING

FIELD OF THE INVENTION

The present invention generally relates to an elastomeric spring and, more particularly, to an elastomeric compression spring having an elongated, arcuate or curved configuration between opposed ends thereof and methods for making such a spring.

BACKGROUND OF THE INVENTION

Compression springs manufactured from elastomer materials are well known in the art. Rather than being curved, however, such springs typically have a cylindrical shape and are directed to applications requiring very high spring rates for absorbing substantial quantities of energy in applications such as associated with the railcar industry. In addition, such known springs are designed to absorb energy directed axially against one or both ends of the spring.

Elongated compression springs which are curved have broad and varied applications. They can be used singularly or in combination relative to each other to absorb energy. Typically, with this type of spring, the load is generally applied to an apex of the curved spring and one or both of the longitudinally spaced ends thereof are confined against longitudinal expansion.

It can be beneficial if the spring can be adjusted to affect the spring rate. It is difficult to predict the exact conditions and stresses to which such a spring will be subjected. The fatigue life of most curved springs, however, is generally limited, thus, increasing the required maintenance of the apparatus with which the spring is arranged in operable combination.

Depending upon their application, most curved springs are loaded not only vertically but also by horizontal forces and torques in the longitudinal vertical and transverse vertical planes. Such forces can be generated in several different modes of operation which, again, are highly dependent upon the particular spring application. Such horizontal forces and torques, however, have been known to cause the curved spring to assume an "S" shaped configuration, a phenomena commonly referred to as "S-ing." The stresses induced in the spring when this occurs can be quite high. To minimize "S-ing" in a curved spring, the stiffness of the spring has been known to be increased. This can, however, detrimentally affect spring performance.

In view of the above, and in accordance with the present invention, there is a continuing need and desire for an elongated compression spring having an arcuate shape between opposed longitudinally spaced ends of the spring.

SUMMARY OF THE INVENTION

In view of the above, and in accordance with one aspect, there is provided an elastomeric spring having first and second end portions joined by a curved mid-portion. The spring is created from a preform formed of an elastomer which is normally free of spring-like characteristics. The elastomer from which the preform is created has a molecular structure along with a ratio of plastic strain to elastic strain greater than 1.5 to 1. The molecular structure of the elastomer, extending along a lengthwise section of the mid-portion of the spring, is oriented in at least one direction such that a predetermined spring rate is imparted to the preform whereby transmuting the preform into the elastomeric spring.

In one form, the molecular structure of the elongated member is oriented as a result of working the preform. Moreover, in a preferred form, the spring rate of the spring can be varied by adjusting the longitudinal distance between said first and second end portions, thus, promoting the versatility of the spring. Moreover, in another form, the cross-section of the mid-portion of the elongated member for the spring can be varied in configuration so as to alter the spring rate afforded by such spring.

The elastomeric spring further includes a pair of transversely spaced sides. In one form the sides of the elastomeric spring extend generally parallel to each other and parallel to an elongated axis of the spring. In another form, a transverse distance between the sides of the spring, toward the mid-portion of the spring, is different from the transverse distance between the sides at the free end portions of the spring.

According to another aspect, there is provided an elastomeric spring created from an elastomeric preform which is free of spring-like characteristics. The elastomeric preform has an initial predetermined length defined by a longitudinal distance between first and second end portions joined by a mid-portion. The elastomer forming the preform has a molecular structure along with a ratio of plastic strain to elastic strain greater than 1.5 to 1. The molecular structure, extending along at least the mid-portion of the preform, is oriented as a result of longitudinally working the initial predetermined length of the preform by greater than 30% to 35% thereby allowing the preform to transmute into the elastomeric spring.

Preferably, the spring rate of the elastomeric spring can be varied to promote the versatility of the spring. In one form, the spring rate can be varied by adjusting the distance between the opposed end portions. Alternatively, varying the configuration, including the cross-section of the mid-portion, of the preform will likewise afford variability in the spring rate.

Working of the preform can involve longitudinally stretching the initial predetermined length of the preform by greater than about 30% to about 35%. Alternatively, working the preform can involve folding the preform by bringing the end portions of the preform toward each other a distance sufficient to reduce the initial predetermined length of the preform by greater than about 30% to about 35%.

According to another aspect, there is provided a curved elastomeric spring having longitudinally spaced first and second end portions joined by an arcuate mid-portion and which is created from an elastomeric preform which is free of spring-like characteristics and has a molecular structure along with a ratio of plastic strain to elastic strain greater than 1.5 to 1. The spring has a central or neutral axis with a compression area arranged to one side of the neutral axis and a tension area arranged to an opposed side of the neutral axis. The molecular structure of the spring is oriented, in at least one direction as a result of working the preform in a manner imparting spring-like characteristics to predetermined sections of the preform used to form the elastomeric spring.

One of the many advantages afforded by the spring being that the spring rate can be modified. In one form, changing the longitudinal distance between the first and second end portions of the spring modifies the spring rate. In another form, changing the configuration of the spring, including changing the mid-portion of the spring, can change the spring rate. The spring has a pair of transversely spaced sides. Changing the transverse distance between the spring sides, especially in the mid-portion of the spring, can also serve to change the spring rate.

The elastomer preform from which the spring is created has an initial predetermined size. The preform can take either an elongated strip form or a generally cylindrical-like tube form. Working of the preform involves compressing the initial predetermined size of the preform by greater than 30% to 35% to orient the molecular structure in at least one of the compression and tension areas of the spring. Alternatively, working of the preform involves elongating the initial predetermined size of the preform by greater than 30% to 35% to orient the molecular structure in at least one of the compression and tension areas of the spring.

According to still another aspect, there is provided a method of making a curved compression spring comprising the steps of: providing a preform having first and second end portions with a curved mid-portion therebetween. The preform is formed from an elastomer which is free of spring-like characteristics and has an initial predetermined length defined by a longitudinal distance between the first and second end portions. The elastomer from which the member is formed also has a molecular structure along with a ratio of plastic strain to elastic strain greater than 1.5 to 1. The method further comprises the step of: working the preform so as to orient the molecular structure of the elastomer in at least one direction while transmuting the member into the desired compression spring.

Preferably, the step of working the preform includes the step of: longitudinally compressing the initial predetermined length of the elongated member by greater than about 30% to about 35% so as to orient the molecular structure of the elastomer, along at least the mid-portion, of the preform while facilitating the transmutation of the preform into the desired compression spring. The step of working the preform can also include the step of: longitudinally stretching the initial predetermined length of said preform by greater than about 30% to about 35% so as to orient the molecular structure of the elastomer, along at least the mid-portion thereof, while facilitating the transmutation of the preform into a curved compression spring.

According to another aspect, there is provided an alternative, but equally applicable, method of making a compression spring comprising the steps of: providing a preform having a free ended and elongated tubular shape with first and second radially spaced and generally cylindrical-like surfaces. An initial predetermined distance of the preform is defined by the first surface on the preform. The preform is created from an elastomer which is free of spring-like characteristics and has a molecular structure along with a ratio of plastic strain to elastic strain greater than 1.5 to 1. The process further involves the Step of: working the preform in a predetermined radial direction more than about 35% of the initial predetermined distance defined by the first surface of the preform so as to orient the molecular structure of the elastomer in at least one direction through predetermined sections of the preform defining spring sections. The next Step involes removing at least one spring section from the radially compressed preform along a plane extending generally parallel to the predetermined radial direction the preform was compressed. Each spring section has first and second longitudinally spaced end portions joined by an arcuate mid-portion. The next Step in the process involves dividing each spring section into individual compression springs. Each compression spring has a predetermined width and a predetermined longitudinal distance between opposed end portions of the spring which are joined by an arcuate mid-portion.

The Step of working the preform includes the Step of: radially compressing the initial predetermined distance of the preform by greater than about 30% to about 35% so as to orient the molecular structure of said elastomer in predetermined sections of the preform. Moreover, the The Step of working the preform includes the step of: radially stretching the initial predetermined distance of said the preform by greater than about 30% to about 35% so as to orient the molecular structure of the elastomer in predetermined sections of the preform.

Based on the foregoing, the present invention provides an elastomeric compression spring having an arcuately shaped configuration between opposed free end portions thereof.

Another feature of the present invention relates to providing an elastomeric spring whose configuration can be modified to change operating characteristics of the elastomeric spring.

Still another feature of the present invention relates to a method for making an elastomeric compression spring having an arcuately shaped configuration between opposed free ends thereof.

These and other features, aims and advantages of the present invention will become more readily apparent from the following drawings, detailed description and appended claims.

DESCRIPTION OF THE DRAWINGS

FIG. 1 is a side elevational view of one form of an elastomeric compression spring embodying principals of the present invention;

FIG. 2 is a top plan view of the elastomeric spring shown in FIG. 1;

FIG. 3 is an end view of the elastomeric spring shown in FIG. 1;

FIG. 4 is a side elevational view of another form of elastomeric compression spring embodying principals of the present invention;

FIG. 5 is a top plan view of the spring shown in FIG. 4;

FIG. 6 is an end view of the spring shown in FIG. 4;

FIG. 7 is a side elevational view of another alternative form of an elastomeric spring embodying principals of the present invention;

FIG. 8 is a side elevational view of another alternative form of an elastomeric spring embodying principals of the present invention;

FIG. 9 is a top plan view of the spring shown in FIG. 8;

FIG. 10 is an end view of the spring shown in FIG. 8;

FIG. 19 is an end view of another preform that can be used during the process of making the elastomeric springs shown in FIGS. 1 through 13;

FIG. 20 is a side elevational view of the preform illustrated in FIG. 19;

DESCRIPTION OF THE INVENTION

Figure 11:
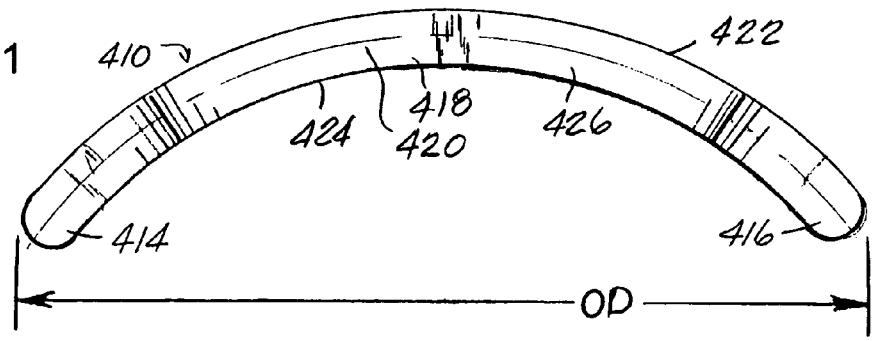
FIG. 11 is a side elevational view of still another alternative form of an elastomeric spring embodying principals of the present invention.

While the present invention is susceptible of embodiment in multiple forms, there is shown in the drawings and will hereinafter be described preferred embodiments of the invention, with the understanding the present disclosure sets forth exemplifications of the invention which are not intended to limit the invention to the specific embodiments illustrated and described.

Referring now to the drawings, wherein like reference numerals refer to like parts throughout the several views, there is shown in FIGS. 1 through 3 one form of a longitudinally elongated, elastomeric compression spring, generally identified by reference numeral 10, embodying principals of the present invention. As shown, spring 10 defines a longitudinal axis 12 and has first and second axially aligned, longitudinally spaced end portions 14 and 16, respectively, joined by an arcuate or curved mid-portion 18. As shown in FIG. 1, spring 10 defines an operative distance OD between the longitudinally spaced end portions 14 and 16.

As shown in FIG. 1, spring 10 defines a central or neutral axis 20 along with radially spaced, generally planar first and second surfaces 22 and 24, respectively, extending the length of the spring 10 and disposed to opposed sides of the central or curved longitudinal axis 20. In the embodiment illustrated in FIG. 1, spring 10 has a substantially constant thickness between the first and second surfaces 22 and 24, respectively, and extending along the length of the spring 10. As such, a predetermined spring rate will be yielded upon deflection of the compression spring 10.

Additionally, and in the embodiment illustrated in FIGS. 1 through 3, spring 10 further includes a pair of transversely spaced sides 26 and 28 extending the length of the spring 10. In the illustrated embodiment, the sides 26 and 28 extend generally parallel relative to each other and generally parallel to the longitudinal axis 12 of spring 10.

Another embodiment of a spring embodying principals of the present invention is illustrated in FIGS. 4 through 6. This alternative form of elastomeric spring is designated generally by reference numeral 110. The elements of this alternative form of spring that are identical or functionally analogous to those components or elements of spring 10 discussed above are designated generally by reference numerals identical to those used above with the exception this embodiment of elastomeric spring uses reference numerals in the 100 series.

Spring 110 defines a longitudinal axis 112 (FIG. 5) with axially aligned, longitudinally spaced end portions 114 and 116 joined by an arcuate or curved mid-portion 118. As shown in FIG. 4, spring 110 also defines an operative distance or length OD between the longitudinally spaced end portions 114 and 116. The elongated spring 110 further defines a central or curved longitudinal axis 120 (FIG. 4) with first and second radially spaced surfaces 122 and 124, respectively, extending along the length of the spring 110, and disposed to opposed sides of the central or neutral axis 120.

Spring 110 further includes a pair of sides 126 and 128. In the embodiment illustrated in FIGS. 4 through 6, the sides 126, 128 of spring 110 extend generally parallel relative to each other and generally parallel to the longitudinal axis 114 of spring 110.

To enhance its versatility, one of the many advantages afforded by the spring design of the present invention relates to the ability to change the spring rate provided by the elastomer spring while keeping the operative distance or length OD of the spring 110 substantially equal to that of spring 10 by modifying the cross-sectional design or configuration of the mid-portion 118 of the spring. In the form shown in FIGS. 4 through 6, the mid-portion 118 of spring 110 is provided with one or more areas of varying cross-sectional thickness.

To effect such ends, spring 110 can include a series of throughbores or channels 140, 142, 144, 146 and 148 which, in one form, have varying diameters and extend transversely through the mid-portion 118 of the spring 110 and open to opposed sides 126, 128 of spring 110. As shown, each bore or channel 140 through 148 has a closed marginal edge 143 defined between surfaces 122 and 124 of the mid-portion 118 of spring 110. Of course, it should be appreciated, elongated arcuate channels or the like, of varying sizes, can likewise be substituted for the illustrated bores 140, 142, 144, 146 and 148 without detracting or departing from the spirit and scope of the present invention. As will be appreciated, the mid-portion 118 of spring 110, with its variable cross-section, will advantageously permit spring 110 to yield a spring rate or load deflection curve different from spring 10 while having the same operative length OD as spring 10.

Another embodiment of a spring embodying principals of the present invention is illustrated in FIG. 7. This alternative form of elastomeric spring is designated generally by reference numeral 210. The elements of this alternative form of spring that are identical or functionally analogous to those components or elements of spring 10 discussed above are designated generally by reference numerals identical to those used above with the exception this embodiment of elastomeric spring uses reference numerals in the 200 series.

Spring 210 includes axially aligned, longitudinally spaced end portions 214 and 216 joined by an arcuate or curved mid-portion 218. As shown, spring 210 defines a central axis 220 with first and second radially spaced surfaces 222 and 224, respectively, extending along the length of spring 210, and arranged to opposed sides of a central axis of spring 210. As shown in FIG. 7, spring 210 defines an operative distance or length OD between the longitudinally spaced end portions 214 and 216.

Advantageously, the spring rate or operating characteristics of spring 210 can be changed by modifying the cross-sectional design or configuration of the mid-portion 218 of the spring 210 while keeping the operative length OD of spring 210 the same as spring 10. In the form shown in FIG. 7, the mid-portion 218 of the spring 210 is provided with a varying cross-sectional thickness. As shown, and proximately midlength of the mid-portion 218, spring 210 is formed with a cross-sectional, generally longitudinally centralized area 225 wherein the elastomer material between the radially spaced surfaces 222 and 224 is thinner than in other areas of the mid-portion 218 disposed in longitudinally spaced relation from the midlength of the mid-portion 218 of spring 210. In the illustrated embodiment, the thinner cross-sectional area 225 of the mid-portion 218 extends transversely across the width of spring 210. As should be appreciated, the mid-portion 218 of spring 210, with a thinner cross-sectional configuration arranged proximately midlength of the mid-portion 218, will advantageously permit spring 210 to yield a spring rate or load deflection curve different from spring 10 while spring 210 will have the same operative distance or length between the end portions 214, 216 as does spring 10.

Another embodiment of a spring embodying principals of the present invention is illustrated in FIGS. 8 through 10. This alternative form of elastomeric spring is designated generally by reference numeral 310. The elements of this alternative form of spring that are identical or functionally analogous to those components or elements of spring 10 discussed above are designated generally by reference numerals identical to those used above with the exception this embodiment of elastomeric spring uses reference numerals in the 300 series.

Spring 310 defines a longitudinal axis 312 (FIG. 9) and axially aligned, longitudinally spaced end portions 314 and 316 joined by an arcuate mid-portion 318. Spring 10 defines a central or neutral axis 320 with radially spaced, generally planar first and second surfaces 322 and 324, respectively, extending the length of the spring 310 and disposed to opposed sides of the central axis 320. Spring 310 also includes a pair of sides 326 and 328 each extending the length thereof. As shown in FIG. 8, spring 310 also defines an operative distance or length OD between the longitudinally spaced end portions 314 and 316.

The illustration of the elastomeric spring 310 in FIGS. 8 through 10 is another example of how the operating characteristics of the spring can be changed by modifying the design of the mid-portion 318 of the spring 310. In the form shown in FIGS. 8 through 10, the mid-portion 318 of the spring 310 is provided with varying widths along the length thereof.

In the exemplary embodiment shown in FIGS. 8 through 10, the transverse width of the elastomer material forming the mid-portion 318 of spring 310, i.e., the amount of elastomer between the opposed sides 326, 328 of spring 310 changes as a function of the longitudinal distance measured from proximately midlength of the mid-portion 318 toward either end portion 314, 316. As shown in FIGS. 8 through 10, spring 310 is formed with a narrower width and, thus, a reduced amount of elastomer material, between the opposed sides 326, 328 proximately midlength of the mid-portion 318 than are other widthwise areas between the opposed sides 326, 328 longitudinally spaced from proximately midlength of the mid-portion 318. As such, the reduced amount of elastomer toward the longitudinal central area of the mid-portion 318 will yield a different spring rate or operating characteristic than the wider areas of elastomer material does in those areas disposed in longitudinally spaced relation from proximate the midlength of the mid-portion 318 of spring 310. Preferably, the reduction of elastomer material toward the midlength of the mid-portion 318 of spring 312 is substantially equalized toward opposed sides 326, 328 relative to the longitudinal axis 312 of spring 310. As such, the elastomer spring 310 will tend to be free of twists and "S-ing" during operation of the spring 310. The mid-portion 318 of spring 310, with a narrowed configuration arranged proximately midlength of the mid-portion thereof, will advantageously permit spring 310 to yield a spring rate or load deflection curve different from spring 10.

Figure 12:
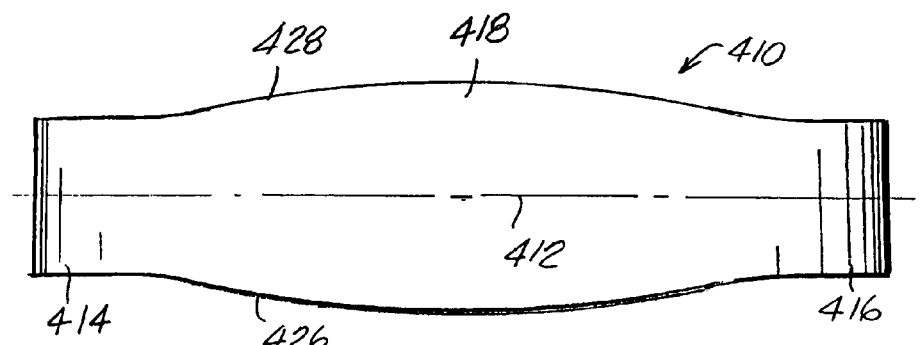
FIG. 12 is a top plan view of the spring shown in FIG. 11.
Figure 13:
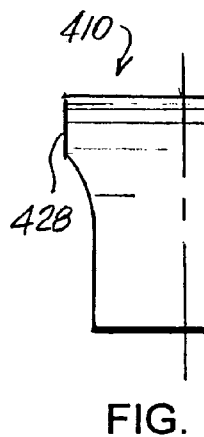
FIG. 13 is an end view of the spring shown in FIG. 11.

Still another embodiment of a spring embodying principals of the present invention is illustrated in FIGS. 11 through 13. This alternative form of elastomeric spring is designated generally by reference numeral 410. The elements of this alternative form of spring that are identical or functionally analogous to those components or elements of spring 10 discussed above are designated generally by reference numerals identical to those used above with the exception this embodiment of elastomeric spring uses reference numerals in the 400 series.

Spring 410 defines a longitudinal axis 412 (FIG. 12) and has first and second axially aligned, longitudinally spaced end portions 414 and 416, respectively, joined by an arcuate mid-portion 418. Spring 410 defines a central or curved longitudinal axis 420 along with radially spaced, generally planar first and second surfaces 422 and 424, respectively, extending the length of the spring 410 and disposed to opposed sides of the central or longitudinal axis 420. As shown in FIG. 12, spring 410 also defines an operative distance or length OD between the longitudinally spaced end portions 414 and 416. Spring 410 also includes a pair of opposed sides 426 and 428 each extending the length of member 410.

The elastomeric spring 410 shown in FIGS. 11 through 13 is another example of how the operating characteristics of the elastomer spring can be changed by modifying the design or configuration of the mid-portion 418 of the spring 410. As best shown in FIG. 12, the mid-portion 318 of the spring 310 is provided with varying widths along the length thereof.

As shown in FIG. 12, the transverse dimension of the elastomer material between the opposed sides 426 and 428 in the mid-portion 418 of spring 410 changes as a function of the longitudinal distance measured from proximately midlength of the mid-portion 418 toward either end portion 414, 416. In the exemplary embodiment, spring 410 is formed with a wider transverse width and, thus, an increased amount of elastomer, between the opposed sides 426, 428 proximately midlength of the mid-portion 418 than are other transverse areas between the opposed sides 426, 428 longitudinally spaced from proximately midlength of the mid-portion 418. As such, the increased amount of elastomer disposed toward the longitudinal central area of the mid-portion 418 will offer a different operating characteristic than the narrowing amount of elastomer material disposed in longitudinally spaced relation from proximate the midlength of the mid-portion 418 of spring 410.

Preferably, the increase in elastomer material proximately midlength of the mid-portion 418 of spring 410 is substantially equalized on opposed sides 426, 428 relative to the longitudinal axis 412 of spring 310. As such, the elastomer spring 410 will tend to be free of twists and "S-ing" during operation of the spring 410. The mid-portion 418 of spring 410, with a narrowed configuration arranged proximately midlength of the mid-portion thereof, will advantageously permit spring 410 to yield a spring rate or load deflection curve different from spring 10.

Although not shown, it should be appreciated, any of the embodiments of the elastomeric spring shown and described above can further include an eye section arranged toward each free end portion of the spring. Preferably, each eye section defines a throughbore or opening extending transverse to the longitudinal axis of the spring. As will be appreciated, each eye section can be formed integral with the elastomeric spring or can be formed as an attachment thereto without detracting or departing from the spirit and scope of the invention.

Figure 14:
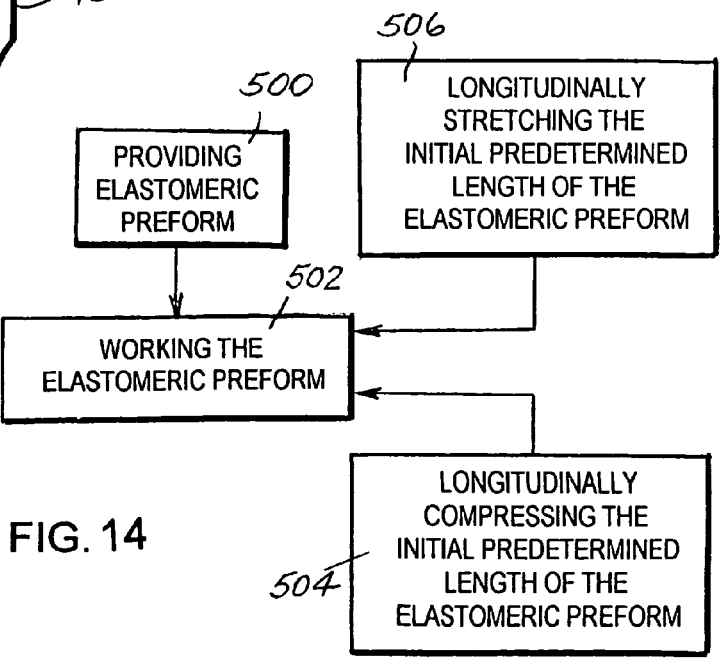
FIG. 14 is a graphical representation of one method or process for making any one of the elastomeric springs illustrated in FIGS. 1 through 13.
Figure 16:
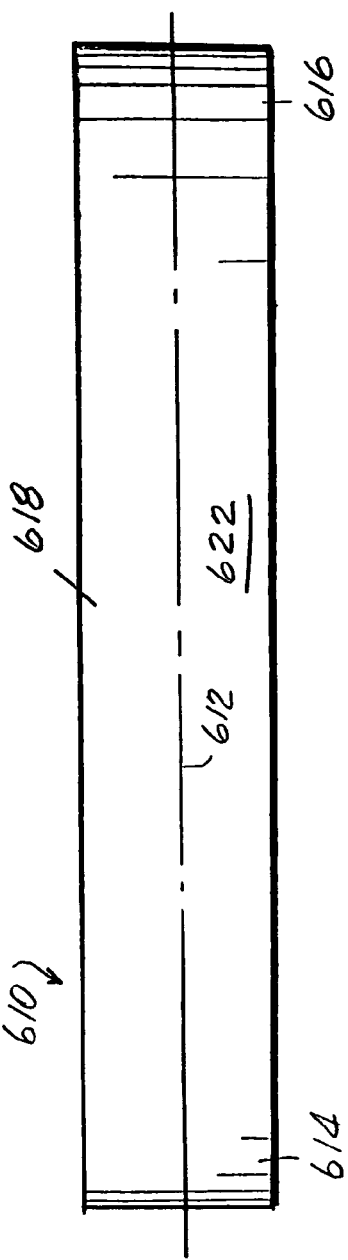
FIG. 16 is a top plan view of the preform shown in FIG. 15.
Figure 17:
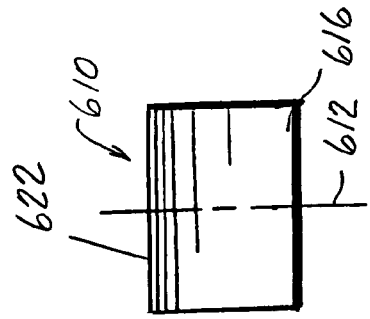
FIG. 17 is an end view of the preform shown in FIG. 15.

FIG. 14 schematically illustrates one method or process for making any of the elastomeric curved compression springs shown and described above. At Step 500, a monolithic preform, generally identified in FIGS. 15 through 17 by reference numeral 610 is provided. According to this method of making the elastomeric spring, preform 610 has a configuration similar to the desired resultant shape of the desired elastomeric spring. That is, the preform 610 is initially fabricated with the desired shape and/or operational characteristics of the resultant spring.

Figure 15:
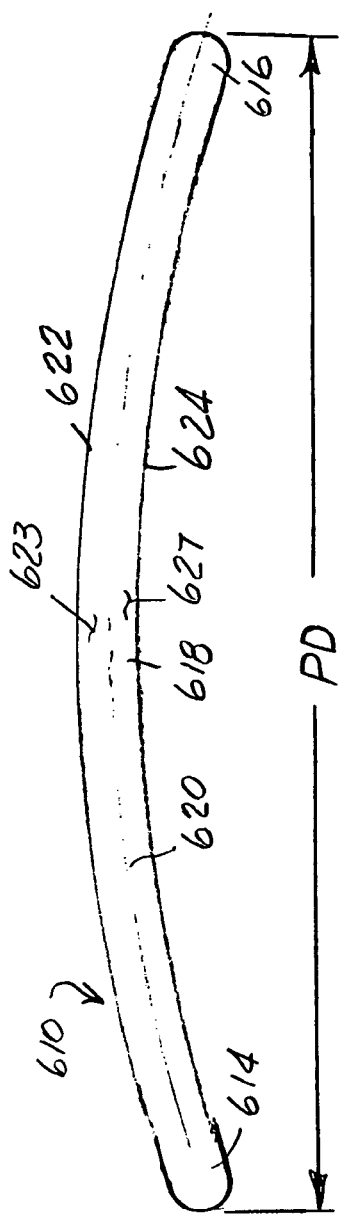
FIG. 15 is a side elevational view of one form of a preform used during the process of making the elastomeric springs shown in FIGS. 1 through 13.

As shown, preform 610 includes a longitudinal axis 612 (FIG. 16) and has first and second axially aligned, longitudinally spaced end portions 614 and 616, respectively, joined by a mid-portion 618. Preferably, the elongated preform 610 defines a central axis 620 with a curved surface 622 and a curved surface 624 disposed in radially spaced relation from surface 622. Each surface 622, 624 extends the length of the preform 610, and is disposed to opposed sides of the central axis 620. As shown in FIG. 15, an initial predetermined distance PD separates the end portions 616, 618 of the preform 610. Suffice it to say, opposed sides 626 and 628 of the preform 610 substantially conform in shape to the sides of the desired resultant spring.

The preform 610 can be formed of almost any elastomer having tensile characteristics such that the ratio of plastic strain to elastic strain is greater than 1.5 to 1. The preferred elastomer is a copolyester polymer elastomer manufactured and sold by E. I. duPont de Nemoirs under the trademark Hytrel®. The elastomeric material has a molecular structure and preform 610 has a Shore D durometer hardness ranging between about 37 and 57 durometer. The most preferred embodiment of preform 610 has a Shore D durometer measuring between about 40 and about 55. The elastomer material forming preform 610 is free of spring-like characteristics and is reasonably inert. Significantly, such elastomer is quite durable and has an excellent flex life. Moreover, such elastomer is not subject to tearing or to crack propagation even in relatively thin cross-sections. As known, conventional thermosetting synthetic and natural rubbers do not have the requisite fatigue resistance at these hardness levels. For a more complete description of this elastomer, attention is directed to U.S. Pat. No. 4,198,037 to D. G. Anderson; applicable portions of which are incorporated herein by reference.

Normally, the selected elastomer material is purchased in pellet form, and is injected or extruded into a mold to form the preform 610. Various plastic molding techniques such as melt casting, injection molding, rotational molding, etc, can be used to fabricate the preform 610.

After the preform 610 is formed, the preform 610 is worked, at Step 502 (FIG. 14), in manner orienting the molecular structure of the elastomer material. That is, at process Step 502, the molecular structure of the elastomer material forming the preform 610 is oriented, in at least the mid-portion of the preform, and in at least one direction, such that a predetermined spring rate is imparted to and transmutes the preform 610 into an elongated and curved elastomeric spring.

The phrase or term "working" or "worked" means and refers to controllably manipulating the preform 610 after it is formed. More specifically, and in accordance with one spring forming method, after the preform 610 is fabricated, and at process Step 504, the preform's opposed end portions 614 and 616 are longitudinally compressed toward each other by a distance greater than 30% to 35% of the preform's initial predetermined length PD (FIG. 15). The longitudinal compression of the preform 610 causes the molecular structure of the elastomer disposed between the central axis 620 and the first surface 622, generally referred to as a compression area 623 (FIG. 15), to orient in at least one direction, at least along the mid-portion 618 of the preform 610, whereby resulting in transmutation of the preform 610 into a compression spring.

Notably, during it's initial formation, the mid-portion 618 of preform 610 is preferably configured with an arcuate or curved design so as to likely reduce the degree of twisting or S-ing" as the preform 610 is worked. It should be appreciated, however, the mid-portion 618 of the preform 610 can be initially designed with a generally linear or straight configuration with other suitably directed forces being imparted to the mid-portion 618 of the preform 610 to effect a predetermined bending movement of the mid-potion 618 as the preform 610 is worked to transmute the preform 610 into a curved elastomeric spring.

Upon release of the longitudinal compression of the preform 610, the resultant spring takes a compression spring shape "set", i.e., similar to that illustrated in any of the FIGS. 1 through 13, with a predetermined operative distance OD between the end portions of the particular spring. As will be appreciated, the predetermined operative distance or length OD between the end portions of the resultant spring, after the preform 610 is worked, is prescribed by the space envelope requirements of the particular application with which the spring will be operably used. After the preform 610 is worked, the resultant spring is substantially free of compression set problems within the range of initial compression and, upon subsequent compressions, that is, when the end portions of the resultant spring are maintained in substantially fixed relation relative to each other and a force or load is exerted upon the apex of the mid-portion thereof, the resultant spring will provide a repeatable and substantially constant spring rate and will constantly return or spring back to the desired shape. In part, the "spring back" characteristics, as well as the spring rate characteristics of the resultant spring are the result of the orientation of the molecules of Hytrel® resulting from "working" of the preform 610.

According to one method, and at Step 506 (FIG. 14), after the preform 610 initially formed, the opposed end portions 614 and 616 of the preform 610 can be longitudinally pulled or stretched away from each other by a distance greater than 30% to 35% of the initial predetermined length PD (FIG. 15) of the preform 610. Longitudinally stretching or pulling the preform end portions 614, 616 in opposed directions causes the molecular structure of the elastomer disposed between the central axis 620 and the second surface 624, generally referred to as tension area 627 (FIG. 15), to become oriented in at least one direction, at least along the mid-portion 618 of the preform 610, whereby further facilitating the transmutation of the preform 610 into a compression spring.

Upon release of the longitudinal stretch or pulling force on the preform 610, the resultant spring takes a compression spring shape "set", i.e., similar to that illustrated in any of the FIGS. 1 through 13, with a predetermined operative distance OD between the end portions of the particular spring. As such, the resultant compression spring is free of compression set problems and, upon subsequent compressions, that is, when the end portions of the spring are maintained in substantially fixed relation relative to each other and a force or load is exerted upon the apex of the mid-portion thereof, the resultant spring will provide a repeatable and substantially constant spring rate and will constantly return or spring back to the desired shape. In part, the "spring back" characteristics, as well as the spring rate characteristics of the spring result from the orientation of the molecules of Hytrel® resulting from "working" of the preform 610.

Of course, the process of working the preform 610 can include process Steps 504 and 506 either individually or in combination or in reverse order relative to each other without detracting or departing from the present invention. That is, and during working of the preform 610, and after the opposed end portions 614 and 616 have been compressed relative to each other, the predetermined operative distance or length OD of the resultant spring may require correction. Accordingly, the end portions of the spring can thereafter be stretched or pulled in opposed directions to accomplish the desired operative length or spacing OD between the opposed ends of the compression spring. Similarly, and during working of the preform 610, and after the opposed end portions have been stretched or pulled relative to each other, the predetermined operative distance OD between the opposed ends of the resultant spring may require correction. Accordingly, the end portions can thereafter be compressed toward each other to accomplish the desired ends including the desired spacing OD between the opposed ends of the spring.

Figure 18:
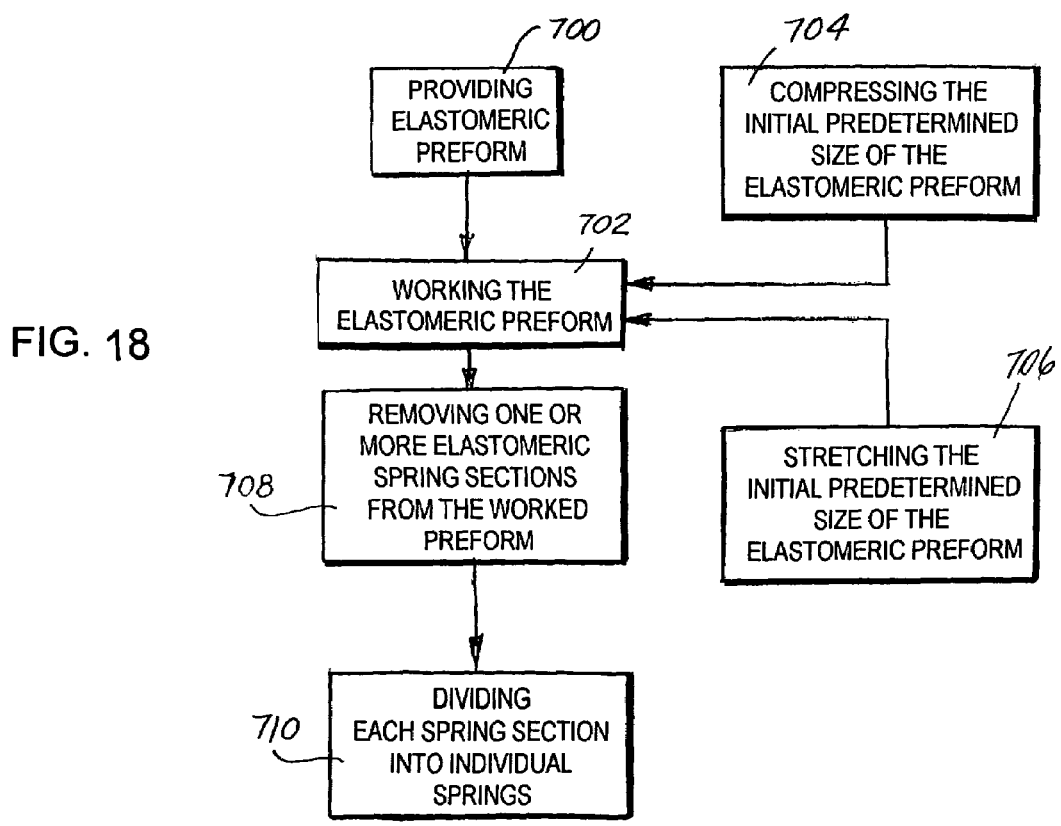
FIG. 18 is a graphical representation of an alternative method or process for making any one of the elastomeric springs illustrated in FIGS. 1 through 13.

FIG. 18 schematically illustrates another method or process for making any of the elongated elastomeric compression springs shown and described above. As shown in FIG. 18, this alternative process begins at Step 700 with providing a monolithic preform, generally identified in FIGS. 19 and 20 by reference numeral 810. According to this alternative method of making an elastomeric compressions spring, preform 810 has a free ended and elongated tubular-like configuration. The elastomeric material comprising the preform 810 has a central axis 820 between the first and second radially spaced, generally cylindrical-like or curved surfaces 822 and 824, respectively. As used herein, the term "central axis" means and refers that line that bisects any arcuate portion of the preform 810. As shown, the preform 810 has an initial predetermined diameter or size PD defined by the second surface 824 thereof Notably, the initial predetermined diameter or size PD of the preform 810 will have a direct correlation to the desired operative distance or length OD between opposed end portions of the desired for the resultant elongated compression spring.

The preform 810 is fabricated from substantially the same elastomeric material as preform 610 described above. Suffice it to say, the elastomeric material used to form the preform 810 has a molecular structure along with a ratio of plastic strain to elastic strain greater than 1.5 to 1.

After the preform 810 is formed or fabricated, the preform 810 is worked at process Step 702 (FIG. 18) in a manner orienting the molecular structure of the elastomer material in a particular fashion. That is, at process Step 702 the molecular structure of the elastomer material forming the preform 810 is oriented in a predetermined fashion and across predetermined areas of the preform 810.

Figure 21:
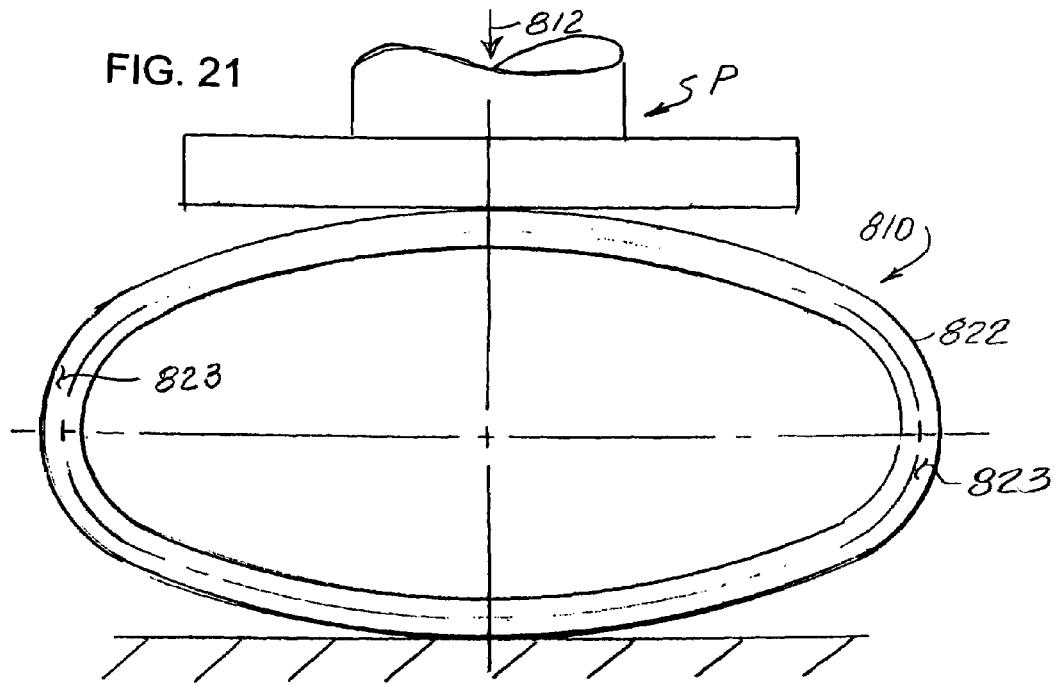
FIG. 21 is a schematic illustration showing working of the preform shown in FIG. 19.

More specifically, and in accordance with an alternative spring making process, after the preform 810 is fabricated, and at Step 704, the preform 810 is controllably manipulated as by squeezing or compressing the preform 810 within a press P and in a predetermined radial direction, indicated by arrow 812, by more than 30% to 35% of the initial predetermined outer diameter PD defined by the outer surface 826 of the preform 810. The radial compression of the preform 810 causes the molecular structure of the elastomer disposed between the central axis 820 and the first surface 822, generally referred to as a compression area 823 (FIG. 21), to orient in at least one direction.

Figure 22:
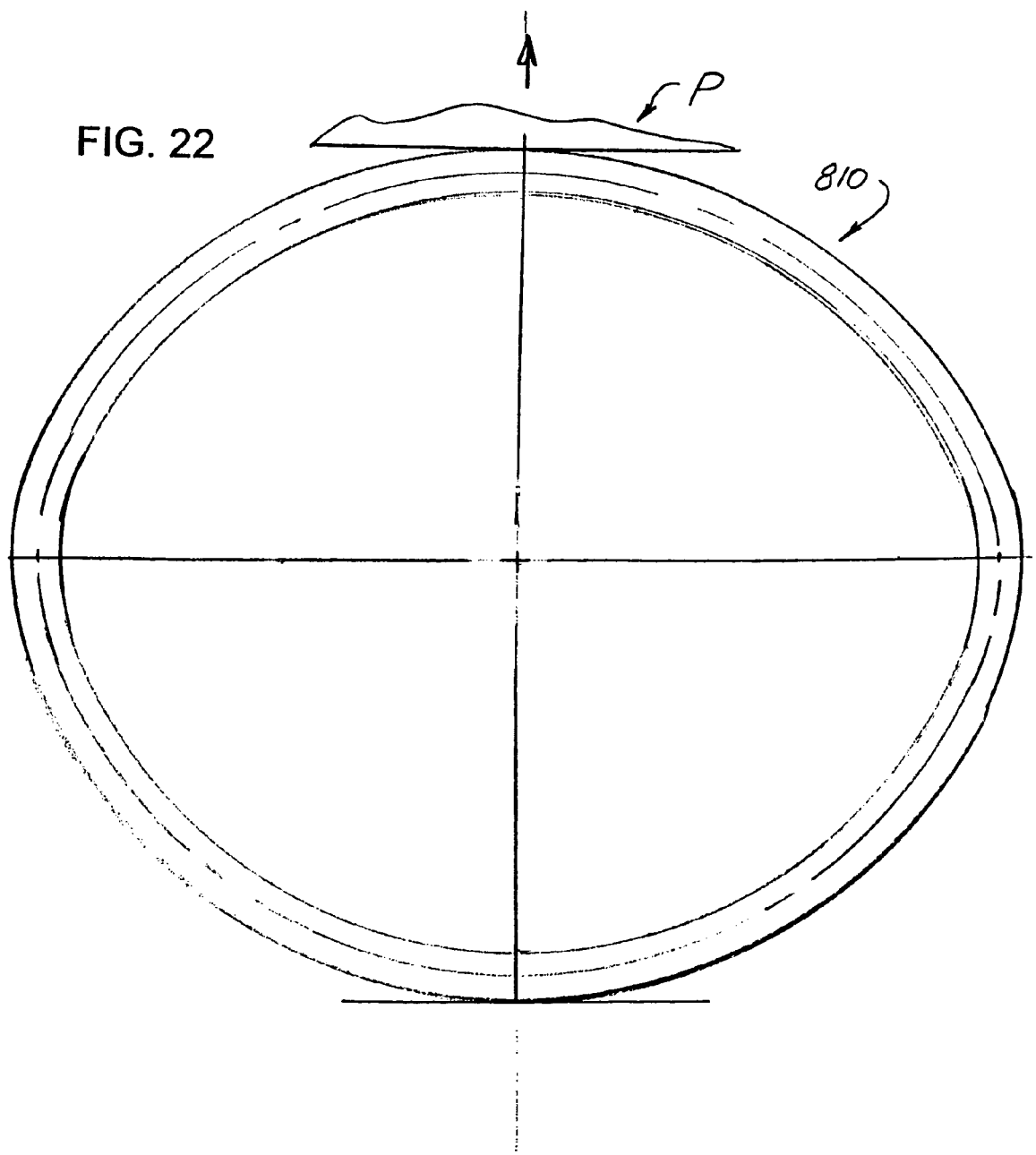
FIG. 22 is a schematic illustration of the preform following working thereof.

After the preform 810 is radially compressed at process Step 704, the preform 810 is removed from the press P it takes a compression spring shape or "set" similar to that illustrated in FIG. 22. As worked, the preform 810 is free of compression set problems and, upon subsequent compressions, that is, when the preform is again radially compressed, the preform will provide a repeatable and substantially constant spring rate and will constantly return or spring back to the shape illustrated in FIG. 22. In part, the "spring back" characteristics, as well as the spring rate characteristics of the preform 810 are the result of the orientation of the molecules of Hytrel® resulting from "working" of the preform 810 at process Step 702.

Figure 23:
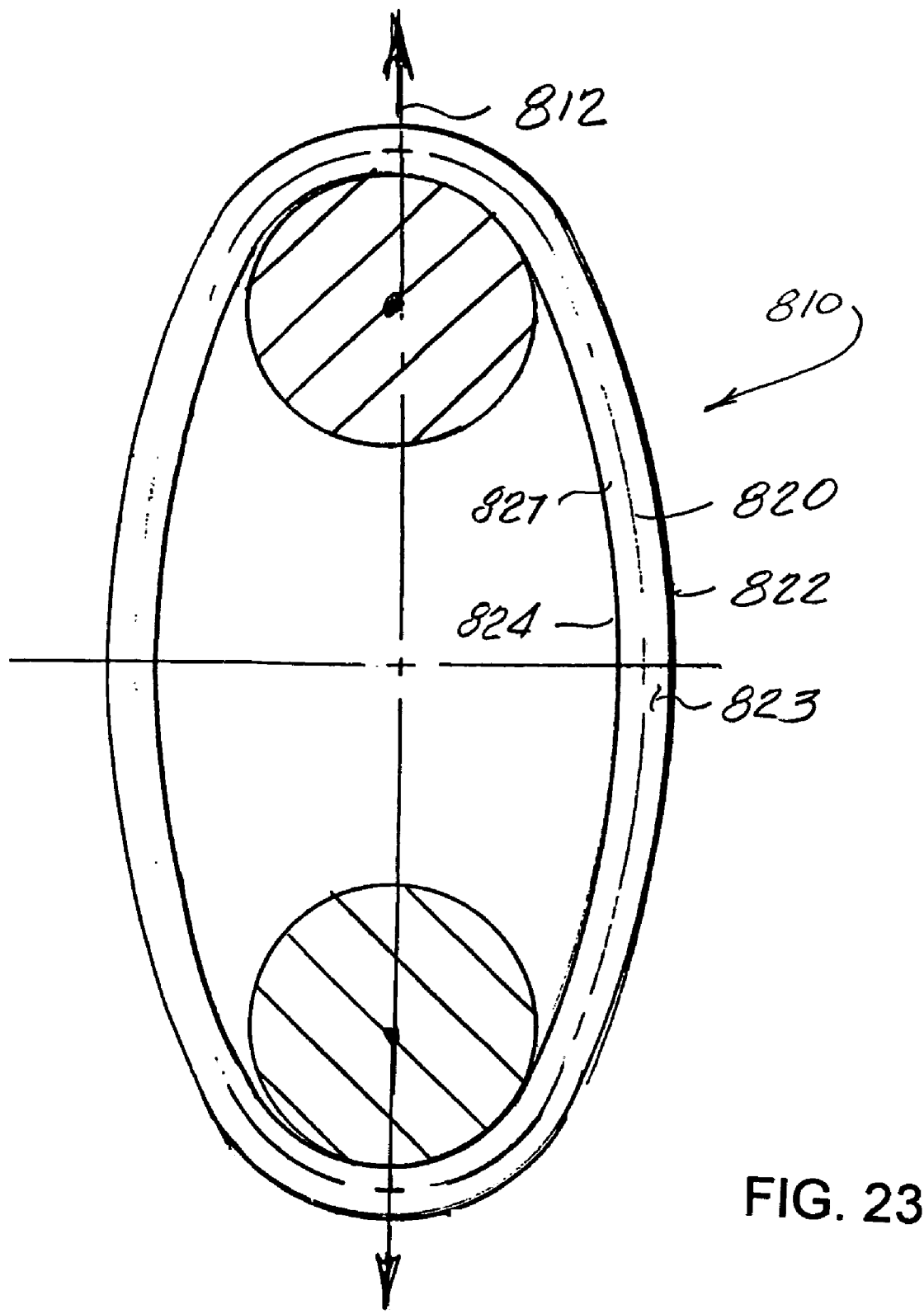
FIG. 23 is shows further working of the preform shown in FIG. 19.

According to this alternative method of making an elongated compression spring, and at process Step 706, after the preform 810 is initially formed, the preform 810 can be radially pulled or stretched in opposed directions and in the direction of the arrow 812 as shown in FIG. 23 by a distance greater than 30% to 35% of the predetermined size or diameter PD of the preform 810. Radially stretching or pulling the preform 810 causes the molecular structure of the elastomer disposed between the central axis 820 and the second surface 824, generally referred to as tension area 827 (FIG. 23), to become oriented in at least one direction.

After the preform 810 is radially stretched at Step 706, the preform 810 returns to a compression spring shape or "set". As worked, preform 810 is free of compression set problems and, upon subsequent compressions, that is, when the preform is again radially compressed, the preform will provide a repeatable and substantially constant spring rate and will consistently return or spring back to a predetermined shape. In part, the "spring back" characteristics, as well as the spring rate characteristics of preform 810 are the result of the orientation of the molecules of elastomer resulting from "working" of the preform 810 at process Step 702.

It should be appreciated, the process of working the preform 810 can include the working Steps 704 and 706 either individually or in combination or in reverse order relative to each other without detracting or departing from the invention. That is, after preform 810 has been compressed at process Step 704, certain areas of the preform 810 to be used as springs may not have the desired predetermined operative distance or length OD for the desired spring, and thus, the "worked" size of the preform may require correction. Accordingly, the preform can thereafter be stretched or pulled in opposed directions to accomplish the desired operative length or spacing OD across those predetermined areas to be used as springs. Similarly, and after the preform has been stretched, the resultant shape may not have the desired predetermined operative distance OD for the desired spring and, thus, the "worked" size of the preform may require correction. Accordingly, the worked preform can be thereafter radially compressed to accomplish the desired ends including the desired spacing OD across those predetermined areas to be used as springs.

Figure 24:
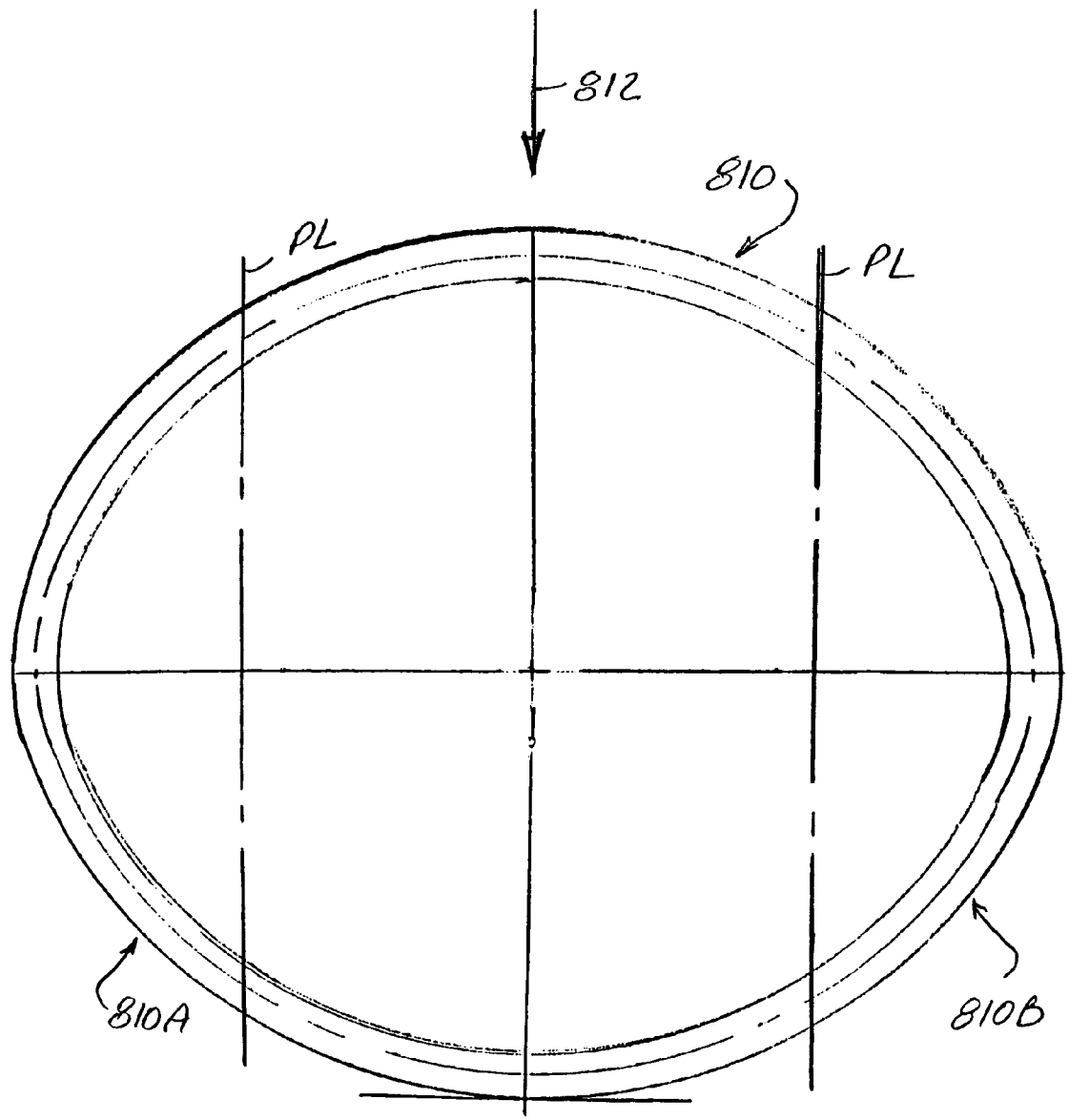
FIG. 24 is a schematic illustration showing the preform being divided into at least two elongated spring sections.

Suffice it to say, after the preform has been worked, certain predetermined areas of the preform are shaped such that elongated compression springs of the type described above can be derived therefrom. According to the process set forth in FIG. 18, and at Step 708, predetermined lengthwise spring sections 810A and 810B (FIG. 24) are removed from the worked preform 810.

At process Step 708, and depending upon the operative distance or length OD desired between the spaced end portions of the resultant spring after preform 810 is worked, the lengthwise spring sections 810A and 810B are cut, severed, sawed, sliced or otherwise removed from the worked preform 810. It is important to note, however, the lengthwise spring sections 810A and 810B are each removed from the preform 810 along a plane PL extending substantially parallel to the predetermined radial direction 812 in which the preform 810 was worked. That is, the lengthwise sections 810A and 810B are each removed or cut from the preform 810 along a plane PL extending substantially parallel to the predetermined radial direction 812 in which the preform 810 was squeezed or compressed.

Figure 25:
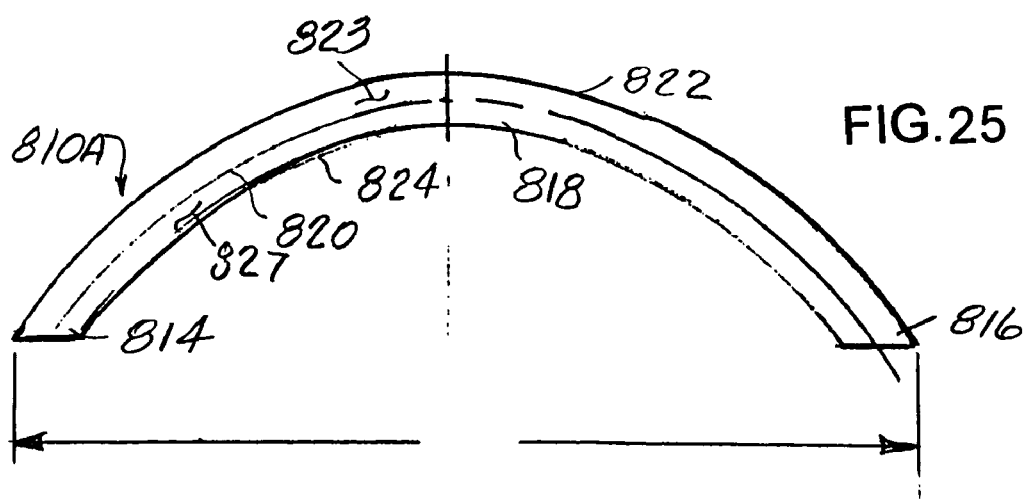
FIG. 25 is an end view of one of the elongated spring sections removed from the preform.

The two resultant spring sections 810A and 810B are preferably the same and, thus, only spring section 810A will be discussed in detail. Spring section 810A appears similar to that schematically illustrated in FIGS. 25 and 26. As shown, spring section 810A has first and second axially aligned, longitudinally spaced end portions 814 and 816, respectively, joined by an arcuate or curved mid-portion 818. Spring 810A further defines an operative distance or length OD between the longitudinally spaced end portions 814 and 816. Spring 810A further defines a central axis 820 along with includes radially spaced, generally planar first and second surfaces 822 and 824, respectively, extending the length of the spring 810A and disposed to opposed sides of the central axis 820.

From an understanding of this process, it will be appreciated, working of the elastomeric preform 810 as discussed above causes the molecular structure of the elastomer material extending across at least the mid-portion 818 of the spring section 810A and disposed between the central axis 820 and the first surface 822, generally referred to as compression area 823, to become oriented in at least one direction. The orientation of the molecular structure of the elastomer transmutes the otherwise normally spring-free elastomeric material into a compression spring. Additionally, working of the elastomeric preform 810, as discussed above, causes the molecular structure of the elastomer extending across at least the mid-portion 818 of spring section 810A and disposed between the central axis 820 and the second surface 824, generally referred to as tension area 827, to become oriented in at least one direction whereby further facilitating transmutation of the spring section 810A into a compression spring. As mentioned, the orientation of the molecular structure of the elastomer transmutes the otherwise normally spring-free elastomeric material into a compression spring.

Figure 26:
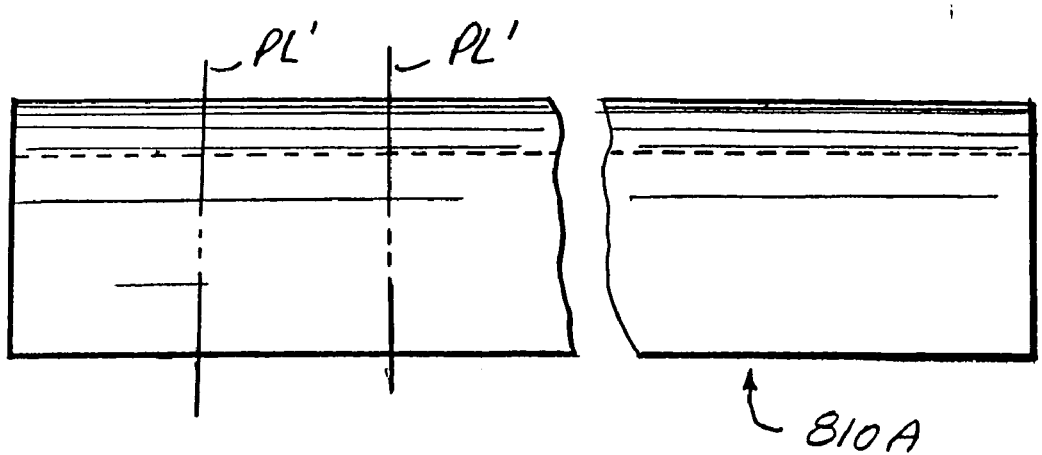
FIG. 26 is a side view showing one of the elongated spring sections being divided into elastomeric compression springs.

As shown in FIG. 26, each spring section 810A and 810B, after having been removed from the preform, has substantially the same length as the preform 810. According to the process set forth in FIG. 18, and at process Step 710, each spring section 810A and 810B is ultimately divided into individual elastomeric springs by cutting, severing, sawing, slicing or otherwise removing the individual springs from the spring section 810A and 810B along one or more planes PL', thus, defining each elongated spring with a predetermined width.

As will be appreciated, each resultant spring, particularly as a result of working the preform 810 at process Steps 702, 704 and 706, is free of compression set problems and, upon subsequent compressions, that is, when the end portions of the spring are maintained in substantially fixed relation relative to each other and a force or load is exerted upon the apex of the mid-portion, the resultant spring will provide a repeatable and substantially constant spring rate and will constantly return or spring back to the desired shape. In part, the "spring back" characteristics, as well as the spring rate characteristics of the spring result from the orientation of the molecules of Hytrel® resulting from "working" of the preform 810.

It will be appreciated, of course, Steps 708 and 710 in the above described process can be reversed relative to each other without detracting or departing from the present invention.

Persons skilled in the art of compression spring design will discover modifications of the subject elastomer preform, according to the above disclosure, will produce varying spring rates that satisfy substantially any desired end. Besides modifying the design of the elastomer preform, changes in the spring rate of the resultant spring invention can also be varied by changing the operative distance or length OD between the opposed ends of the elastomer spring. Additionally, the resultant elastomer spring is quite durable and has an excellent flex life. Moreover, the resultant elastomer spring is generally not subject to tearing or to crack propagation even when the mid-portion thereof has relatively thin cross-sections.

From the foregoing, it will be observed that numerous modifications and variations can be made and effected without departing or detracting from the true spirit and novel concept of the present invention. Moreover, it will be appreciated, the present disclosure is intended to set forth an exemplification of the invention which is not intended to limit the invention to the specific embodiment illustrated. Rather, this disclosure is intended to cover by the appended claims all such modifications and variations as fall within the spirit and scope of the claims.

What is claimed is:

1. An elastomeric spring having an elongate body with first and second longitudinally spaced free ends along with first and second continuous concave surfaces extending between said first and second ends, with said first and second surfaces being radially spaced and in generally parallel relation relative to each other on opposite sides of a curved longitudinal centerline, and with said elongate body being created from a preform formed from an elastomer which is free of spring-like characteristics, and wherein the elastomeric preform from which said elongate body is created has a molecular structure along with a ratio of plastic strain to elastic strain greater than 1.5 to 1, and wherein said preform is worked such that the molecular structure, extending along a lengthwise section of at least a mid-portion of said is oriented in at least one direction and such that said elastomeric preform is transmuted into said elastomeric spring with a predetermined spring rate, and wherein said spring is designed and configured such that forces are applied to said spring in a direction generally perpendicular to the curved longitudinal centerline.

2. The elastomeric spring according to claim 1, wherein said spring has a spring rate which can be varied by adjusting the longitudinal distance between said first and second ends.

3. The elastomeric spring according to claim 1, wherein a mid-portion of said spring has a variable cross-sectional thickness along the length thereof.

4. The elastomeric spring according to claim 1, wherein said elastomeric preform is defined by an arcuate segment having longitudinally spaced ends along with radially spaced first and second continuous concave surfaces extending between said first and second end.

5. The elastomeric spring according to claim 1, wherein said elastomeric spring further includes a pair of transversely spaced sides, and wherein a transverse distance between said sides toward a mid-portion of said spring is different from a transverse distance between said sides at the free ends of said spring.

6. The elastomeric spring according to claim 1, wherein said elastomeric preform has an elongated cylindrical shape between opposed first and second ends thereof.

7. The elastomeric spring according to claim 6, wherein the molecular structure of said preform is oriented as a result of compression of said cylindrically shaped preform in a predetermined radial direction.

8. An elastomeric spring created from an elongate preform having first and second ends along with first and second continuous concave surfaces between said ends, with said first and second surfaces being radially spaced from each other in and in generally parallel relation relative to each other and disposed to opposite sides of a longitudinal curved centerline, and wherein said preform is created from an elastomer material which is free of spring-like characteristics, with said preform having an initial predetermined length defined by a longitudinal distance between said first and second end, and with the elastomer forming said preform having a molecular structure along with a ratio of plastic strain to elastic strain greater than 1.5 to 1, and wherein the molecular structure, extending along at least a mid-portion of said preform, is oriented and elongated as a result of longitudinally working the initial predetermined length of said preform greater than about 30% to about 35%, and wherein the working of said preform causes said preform to transmute into said elastomeric spring, and wherein said spring is designed and configured such that forces are applied to said spring in a direction generally perpendicular to the curved longitudinal centerline.

9. The elastomeric spring according to claim 8 wherein, said spring has a spring rate which can be varied by adjusting the distance between said first and second ends.

10. The elastomeric spring according to claim 8, wherein a mid-portion of said preform has a variable cross-sectional thickness along the length thereof.

11. The elastomeric spring according to claim 8, wherein said elastomeric spring further includes a pair of transversely spaced sides, and wherein a transverse distance between said sides toward a mid-portion of said spring is different from a transverse distance between said sides at the free ends of said spring.

12. The elastomeric spring according to claim 8, wherein the working of said preform involves longitudinally stretching the initial predetermined length of said preform by greater than 35%.

13. The elastomeric spring according to claim 8, wherein the working of said preform involves folding the preform by bringing the ends of the preform toward each other a distance sufficient to reduce the initial predetermined length of said preform by greater than 35%.

14. A curved elastomeric spring having an elongate body with longitudinally spaced first and second ends along with first and second continuous concave surfaces extending between said ends, with said first and second surfaces being radially spaced and in generally parallel relation relative to each other on opposite sides of a curved longitudinal axis, and wherein said elongate body is created from an elastomeric preform which is free of spring-like characteristics and has a molecular structure along with a ratio of plastic strain to elastic strain greater than 1.5 to 1, and wherein, as a result of working said preform, the molecular structure of said elastomer being oriented in at least one direction and said preform is is imparted with spring-like characteristics in predetermined sections so as to form said curved elastomeric spring, and wherein a compression area is disposed to one side of said longitudinal axis and a tension area is disposed to an opposed side of said longitudinal axis, and wherein said spring is designed and configured such that forces are applied to said spring in a direction generally perpendicular to the curved longitudinal centerline thereof.

15. The elastomeric spring according to claim 14, wherein said spring has a spring rate which can be varied by changing the longitudinal distance between said first and second ends.

16. The elastomeric spring according to claim 14, wherein a mid-portion of said spring has a variable cross-sectional thickness along the length thereof.

17. The elastomeric spring according to claim 14, wherein said elastomeric spring further includes a pair of transversely spaced sides, and wherein a transverse distance between said sides toward a mid-portion of said spring is different from a transverse distance between said sides at the free ends of said spring.

18. The elastomeric spring according to claim 14, wherein the longitudinal distance between said ends of said spring is greater than the width of said spring at either end thereof.

19. The elastomeric spring according to claim 14, wherein said preform has an initial predetermined length between opposed free ends thereof.

20. The elastomeric spring according to claim 19, wherein the working of said preform involves longitudinally stretching the initial predetermined length of said preform by greater than 35% so as to orient the molecular structure of said elastomer in at least one of said compression area and said tension area on said elastomeric spring.

21. The elastomeric spring according to claim 19, wherein the working of said preform involves longitudinally compressing the initial predetermined length of said preform by greater than 35% so as to orient the molecular structure of said elastomer in at least one of said compression area and said tension area on said elastomeric spring.

22. The elastomeric spring according to claim 14, wherein said preform has an elongated tubular shape with inner and outer generally cylindrical-like surfaces extending between the opposed free ends thereof.

* * * * *